US012643376B2

(12) United States Patent
Brown et al.

(10) Patent No.: US 12,643,376 B2
(45) Date of Patent: Jun. 2, 2026

(54) DEHUMIDIFICATION CONTROL STRATEGY

(71) Applicant: FORD GLOBAL TECHNOLOGIES, LLC, Dearborn, MI (US)

(72) Inventors: Jeffrey Paul Brown, Farmington Hills, MI (US); Rachael E. Shey, Ferndale, MI (US); James C. Rollinson, Superior Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 248 days.

(21) Appl. No.: 18/160,966

(22) Filed: Jan. 27, 2023

(65) Prior Publication Data

US 2024/0253426 A1     Aug. 1, 2024

(51) Int. Cl.
| | |
|---|---|
| *B60H 3/02* | (2006.01) |
| *B60H 1/00* | (2006.01) |
| *B60H 1/32* | (2006.01) |

(52) U.S. Cl.
CPC ......... *B60H 3/024* (2013.01); *B60H 1/00271* (2013.01); *B60H 1/00278* (2013.01); *B60H 1/00735* (2013.01); *B60H 1/00814* (2013.01); *B60H 1/00899* (2013.01); *B60H 1/00921* (2013.01); *B60H 1/3207* (2013.01); *B60H 1/3228* (2019.05); *B60H 3/02* (2013.01); *B60H 2001/00307* (2013.01); *B60H 2001/00957* (2013.01); *B60H 2001/3291* (2013.01)

(58) Field of Classification Search
CPC ................ B60H 3/024; B60H 1/00271; B60H 1/00278; B60H 1/00735; B60H 1/00814; B60H 1/00899; B60H 1/00921; B60H 1/3207; B60H 1/3228; B60H 3/02; B60H 2001/00307; B60H 2001/00957; B60H 2001/3291
See application file for complete search history.

(56) References Cited

U.S. PATENT DOCUMENTS

| | | | | |
|---|---|---|---|---|
| 2,353,966 | A | * | 7/1944 | Newcombe ............... F01P 9/06 |
| | | | | 165/104.31 |
| 4,326,868 | A | * | 4/1982 | Ozu ...................... F25B 47/022 |
| | | | | 62/196.3 |
| 4,987,748 | A | * | 1/1991 | Meckler ................ F24F 5/0089 |
| | | | | 62/271 |
| 5,131,238 | A | * | 7/1992 | Meckler .................... F24F 1/00 |
| | | | | 62/271 |
| 5,386,709 | A | * | 2/1995 | Aaron ...................... F25B 40/02 |
| | | | | 62/79 |

(Continued)

FOREIGN PATENT DOCUMENTS

| | | | | |
|---|---|---|---|---|
| CA | 2060999 | C | * 4/1995 | ................ F02C 7/12 |
| CN | 103429975 | A | * 12/2013 | ............. F25B 9/008 |

(Continued)

*Primary Examiner* — Ljiljana V. Ciric
(74) *Attorney, Agent, or Firm* — David B. Kelley; Brooks Kushman P.C.

(57)     ABSTRACT

A vehicle thermal system includes a thermal loop with a compressor, condenser, vapor injector, internal heat exchanger, chiller, and bypass valve, and a controller for operation during dehumidification. The controller opens an injector valve to inject vapor into the compressor and opens the bypass valve to reduce flow through the internal heat exchanger under a first condition.

7 Claims, 9 Drawing Sheets

(56) References Cited

U.S. PATENT DOCUMENTS

| | | | | |
|---|---|---|---|---|
| 5,469,716 A * | 11/1995 | Bass | F04C 29/042 | 62/505 |
| 5,640,854 A * | 6/1997 | Fogt | F25B 31/008 | 62/505 |
| 5,878,589 A * | 3/1999 | Tanaka | F25B 1/10 | 165/80.2 |
| 6,449,974 B1 * | 9/2002 | Kampf | F25B 5/00 | 62/324.1 |
| 6,701,722 B1 * | 3/2004 | Seo | F25B 13/00 | 62/77 |
| 7,000,423 B2 * | 2/2006 | Lifson | F25B 13/00 | 62/324.1 |
| 7,062,930 B2 * | 6/2006 | Rayburn | F25B 41/20 | 62/176.1 |
| 7,275,385 B2 * | 10/2007 | Abel | F25B 1/04 | 62/324.4 |
| 7,299,649 B2 * | 11/2007 | Healy | F25B 41/20 | 62/324.4 |
| 7,434,415 B2 * | 10/2008 | Knight | F25B 41/20 | 236/46 C |
| 7,647,790 B2 * | 1/2010 | Ignatiev | F04C 29/0014 | 62/473 |
| 7,770,411 B2 * | 8/2010 | Knight | F25B 6/02 | 62/498 |
| 7,827,809 B2 * | 11/2010 | Pham | F25B 47/025 | 62/324.1 |
| 8,020,402 B2 * | 9/2011 | Pham | F25B 43/006 | 62/509 |
| 8,082,979 B2 | 12/2011 | Greiner et al. | | |
| 8,181,478 B2 * | 5/2012 | Ignatiev | F25B 43/02 | 62/505 |
| 8,197,227 B2 * | 6/2012 | Ernens | F04B 35/00 | 60/660 |
| 8,285,443 B2 * | 10/2012 | Akahoshi | F02D 41/042 | 236/44 C |
| 8,505,331 B2 * | 8/2013 | Pham | F04C 29/042 | 62/509 |
| 8,539,785 B2 * | 9/2013 | Jiang | F25B 49/027 | 62/217 |
| 8,695,369 B2 * | 4/2014 | Wu | F25B 13/00 | 62/324.4 |
| 8,769,982 B2 * | 7/2014 | Ignatiev | F25B 31/002 | 428/188 |
| 8,966,916 B2 * | 3/2015 | Deaconu | F25B 41/39 | 62/324.1 |
| 9,452,659 B2 | 9/2016 | Styles et al. | | |
| 9,677,788 B2 * | 6/2017 | Lifson | F25B 1/10 | |
| 10,113,553 B2 * | 10/2018 | Umeda | F04D 29/444 | |
| 10,399,408 B2 | 9/2019 | Heil et al. | | |
| 10,408,502 B2 * | 9/2019 | Xie | F25B 41/39 | |
| 10,563,673 B2 * | 2/2020 | Umeda | F25B 49/022 | |
| 10,690,383 B2 * | 6/2020 | Xie | F25B 1/10 | |
| 10,717,337 B2 * | 7/2020 | Kim | B60L 58/24 | |
| 10,718,551 B2 * | 7/2020 | Edwards | F25B 21/04 | |
| 10,876,777 B2 * | 12/2020 | Lee | F25B 49/022 | |
| 10,906,376 B2 * | 2/2021 | Enomoto | F01P 7/161 | |
| 11,041,666 B2 * | 6/2021 | Sakae | F25B 49/02 | |
| 11,047,319 B2 * | 6/2021 | Lee | F02D 41/0007 | |
| 11,198,346 B2 * | 12/2021 | Blatchley | B60H 1/321 | |
| 11,254,190 B2 | 2/2022 | He et al. | | |
| 11,267,318 B2 * | 3/2022 | He | B60H 1/00907 | |
| 11,320,183 B2 * | 5/2022 | Kopko | F28D 20/0039 | |
| 11,408,658 B2 * | 8/2022 | Sun | F25B 49/027 | |
| 11,448,441 B2 * | 9/2022 | Zeigler | F25B 49/02 | |
| 11,613,163 B2 * | 3/2023 | Kim | B60H 1/00278 | 62/196.1 |
| 11,927,377 B2 * | 3/2024 | Hammond | F25B 13/00 | |
| 12,065,019 B2 * | 8/2024 | Zeigler | F25B 25/005 | |
| 2004/0089015 A1 * | 5/2004 | Knight | F25B 6/02 | 62/176.1 |
| 2005/0086969 A1 * | 4/2005 | Lifson | F25B 41/24 | 62/324.1 |
| 2005/0166619 A1 * | 8/2005 | Taras | F24F 11/67 | 62/196.4 |
| 2006/0096308 A1 * | 5/2006 | Manole | F25B 9/008 | 62/277 |
| 2008/0047283 A1 * | 2/2008 | Pham | F25B 47/025 | 62/223 |
| 2010/0043475 A1 * | 2/2010 | Taras | F28F 9/0234 | 62/331 |
| 2010/0095704 A1 * | 4/2010 | Ignatiev | F04C 29/0014 | 62/512 |
| 2010/0205988 A1 * | 8/2010 | Jiang | F25B 49/027 | 62/225 |
| 2012/0318014 A1 * | 12/2012 | Huff | F25B 9/008 | 62/509 |
| 2013/0139527 A1 | 6/2013 | Bruce et al. | | |
| 2014/0090406 A1 * | 4/2014 | Ishikawa | F24F 11/30 | 62/82 |
| 2015/0059367 A1 * | 3/2015 | Emo | F25B 45/00 | 62/149 |
| 2015/0128640 A1 * | 5/2015 | Sun | F25B 1/10 | 415/55.5 |
| 2017/0350632 A1 * | 12/2017 | Hirao | F25J 1/0269 | |
| 2019/0030984 A1 * | 1/2019 | Zeigler | F25B 49/02 | |
| 2021/0155078 A1 * | 5/2021 | He | B60H 1/00021 | |
| 2023/0078956 A1 * | 3/2023 | Zeigler | F25B 49/02 | 62/115 |
| 2023/0332779 A1 * | 10/2023 | Warner | F24F 3/1411 | |
| 2024/0253426 A1 * | 8/2024 | Brown | B60H 1/00278 | |
| 2024/0392178 A1 * | 11/2024 | Purohit | F25B 5/02 | |

FOREIGN PATENT DOCUMENTS

| | | | | |
|---|---|---|---|---|
| CN | 211925958 U | | 11/2020 | |
| DE | 112016005644 T5 * | 8/2018 | | B60H 1/00899 |
| EP | 3418655 A1 * | 12/2018 | | F24F 11/89 |
| EP | 2807430 B1 * | 10/2019 | | F04D 17/12 |
| EP | 3584513 A1 * | 12/2019 | | F25B 1/00 |
| EP | 3714215 B1 * | 11/2021 | | B01D 53/06 |
| EP | 3379171 B1 * | 9/2022 | | F25B 1/10 |
| EP | 3403034 B1 * | 11/2022 | | F04D 17/10 |
| EP | 4471357 A1 * | 12/2024 | | B60H 1/00885 |
| FI | 129634 B * | 3/2021 | | |
| JP | 2001030744 A * | 1/2001 | | B60H 1/00342 |
| JP | WO2020039707 A1 * | 2/2020 | | |
| KR | 20230014959 A * | 1/2023 | | |
| SE | 542405 C2 * | 4/2020 | | B01D 53/06 |
| WO | WO-0042363 A1 * | 7/2000 | | F25B 39/02 |
| WO | WO-2007024237 A1 * | 3/2007 | | F24F 3/153 |
| WO | WO-2024204176 A1 * | 10/2024 | | |

* cited by examiner

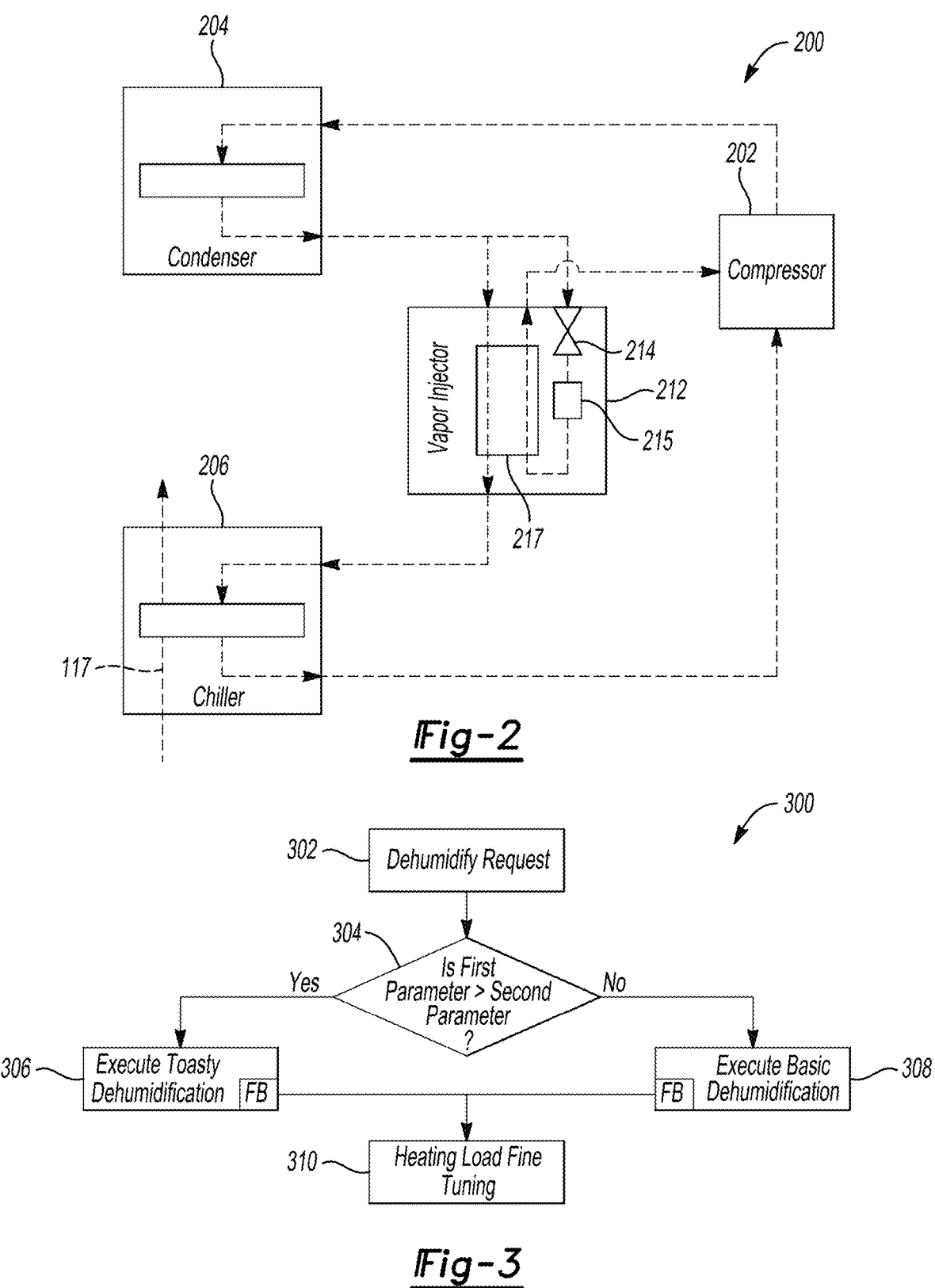
_Fig-2_
_Fig-3_

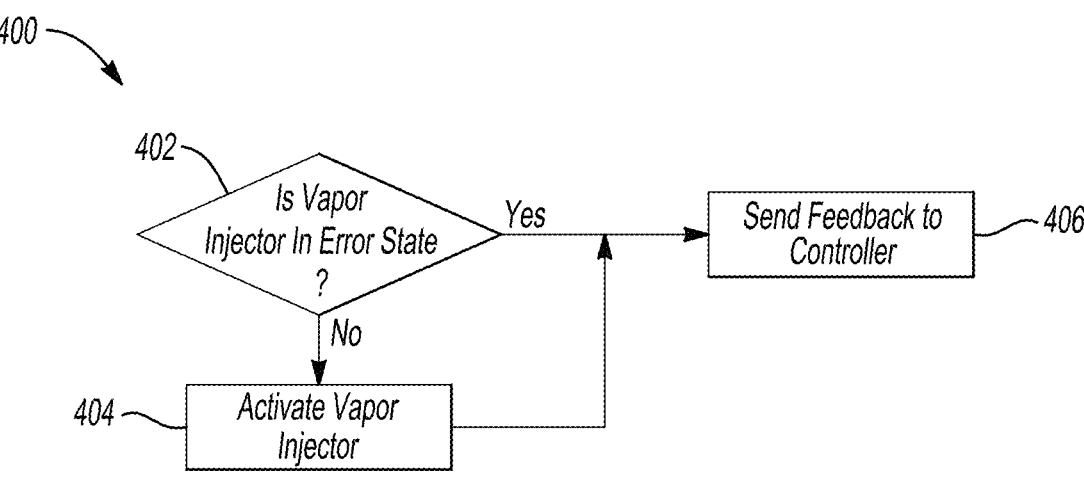
_Fig-4_
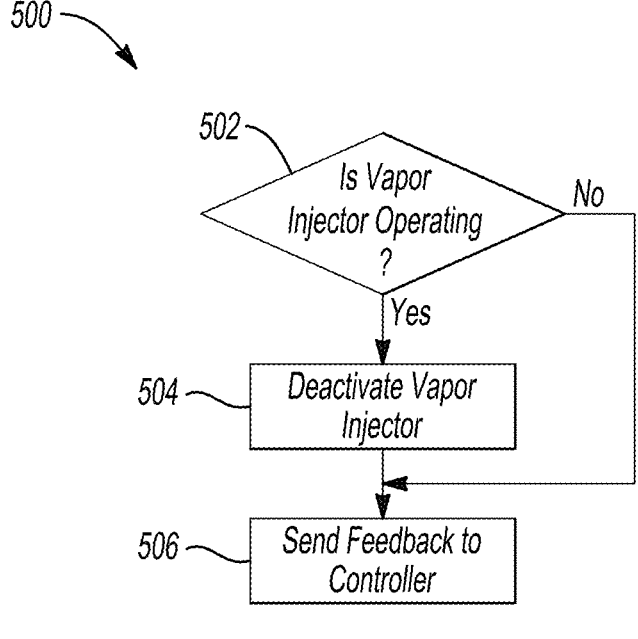
_Fig-5_

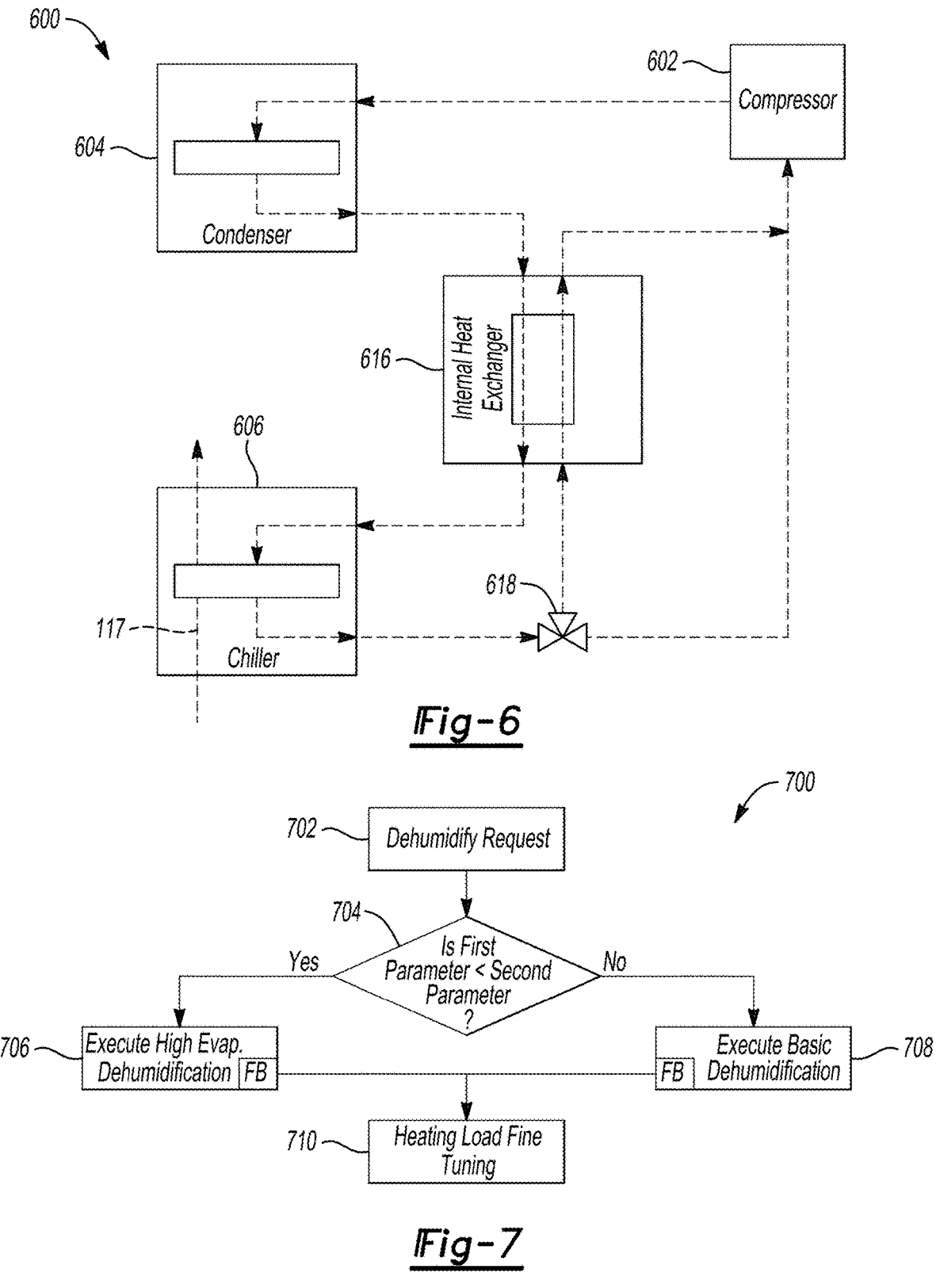
_Fig-6_
_Fig-7_

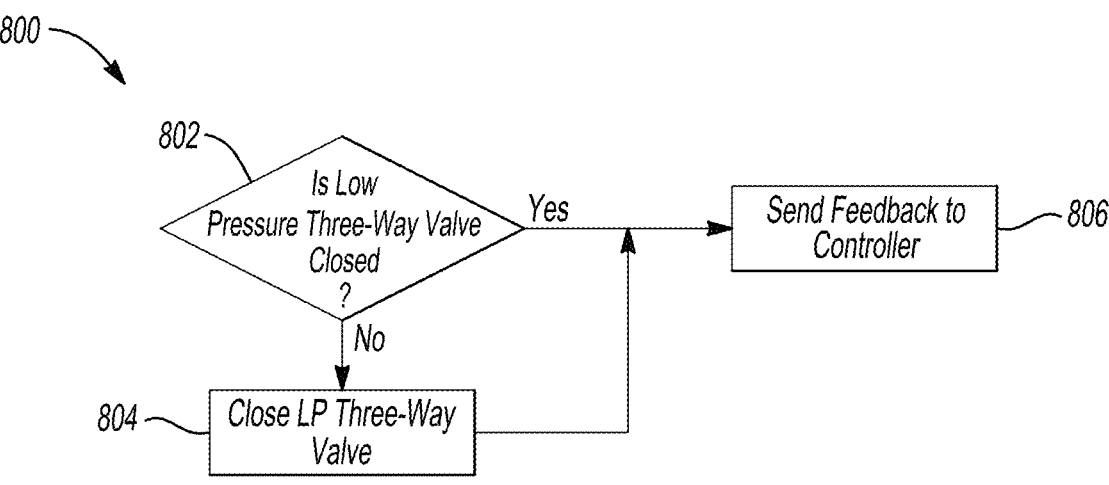
_Fig-8_
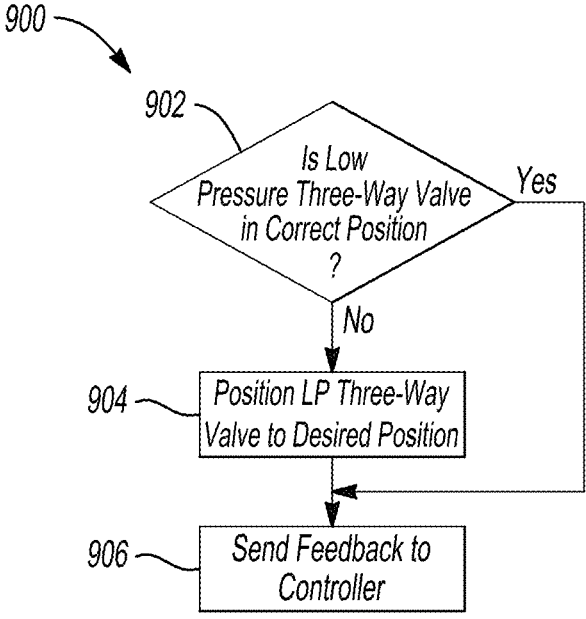
_Fig-9_

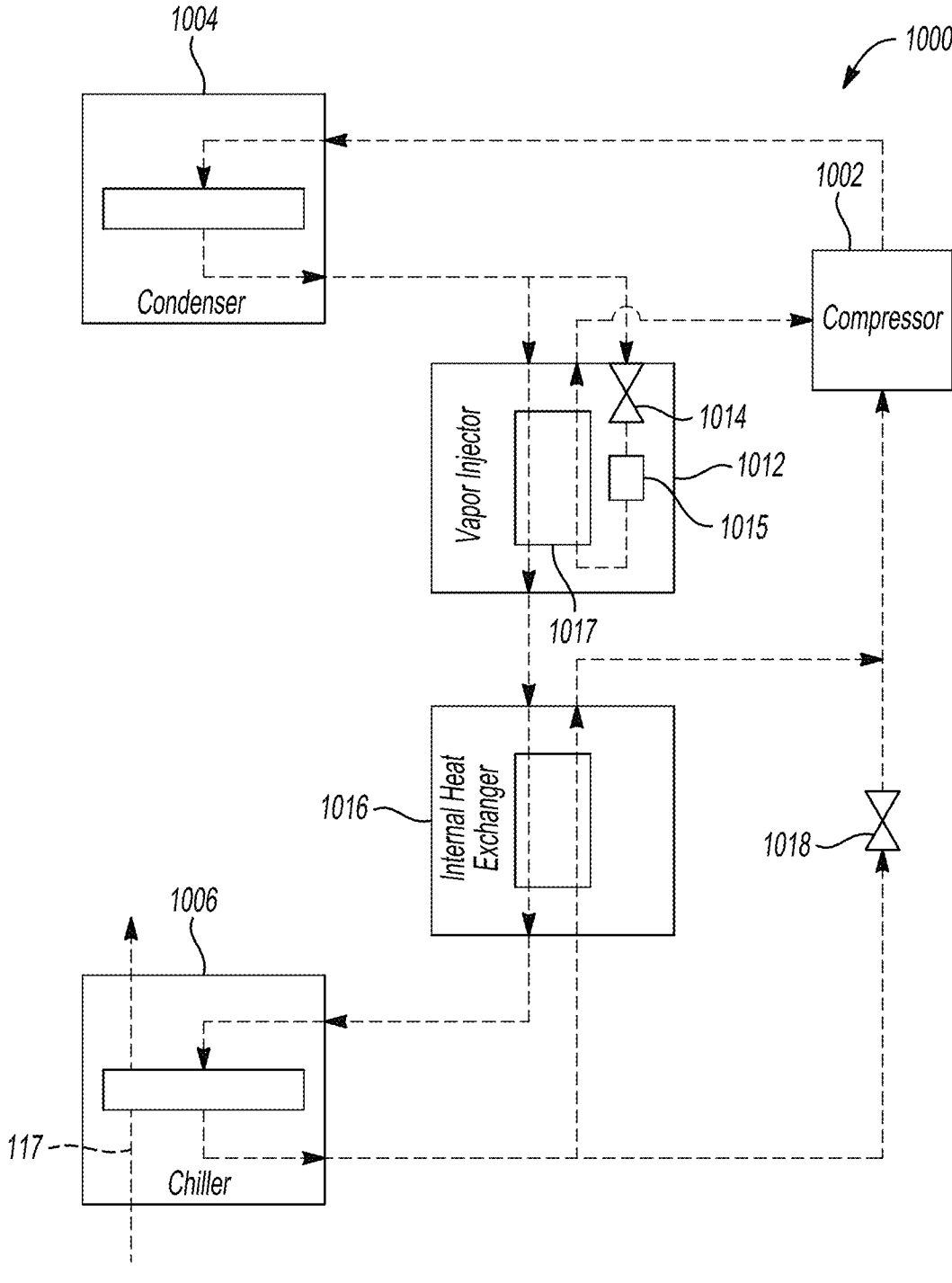
_Fig-10_

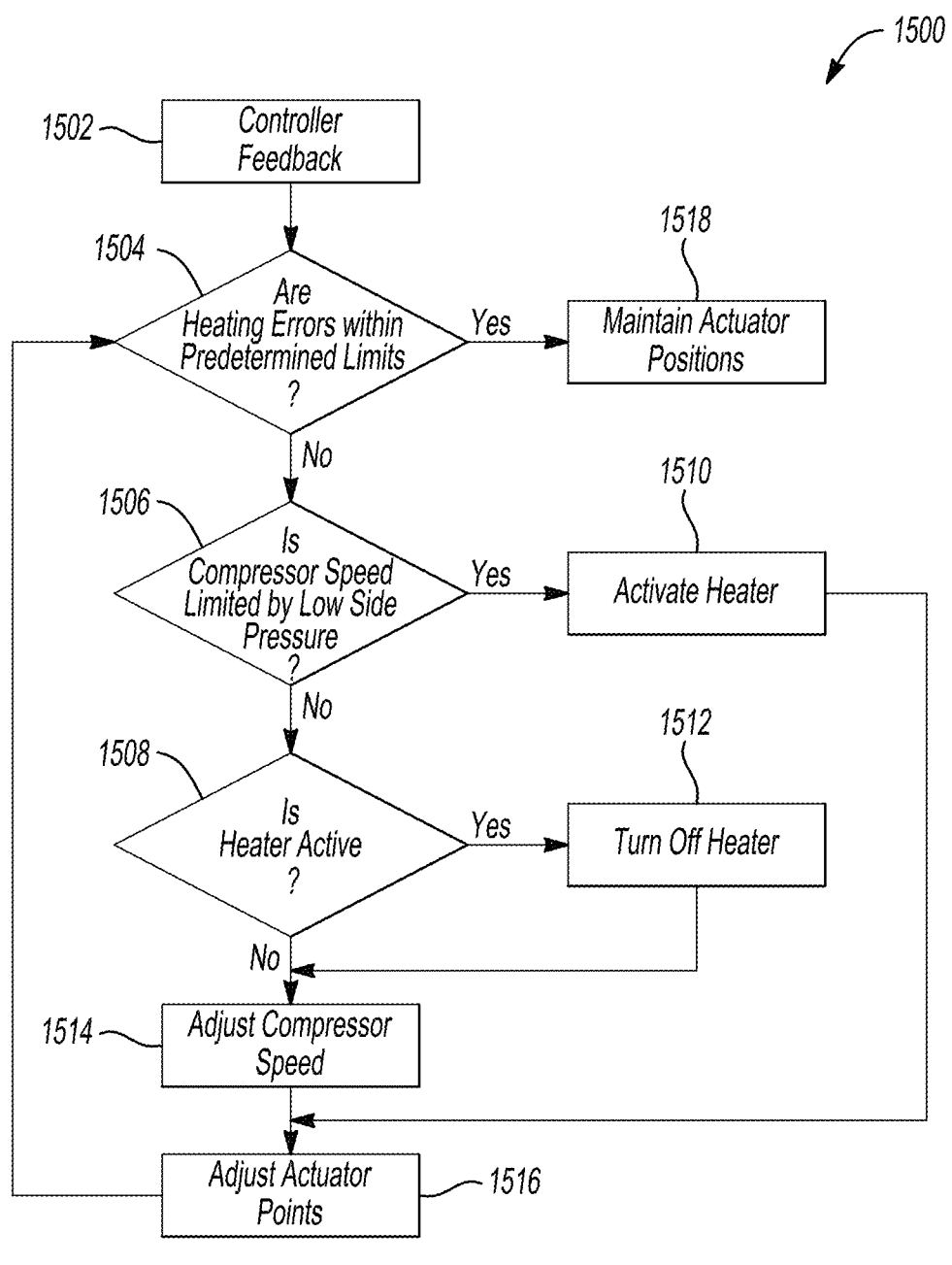
_Fig-15_

DEHUMIDIFICATION CONTROL STRATEGY

TECHNICAL FIELD

Disclosed is a method of heating a vehicle cabin while removing moisture from the same vehicle cabin.

BACKGROUND

When customers are driving in certain climate conditions (such as cold, winter conditions or mild ambient conditions with moderate to high humidity, including high-rain environments), the windshields and side windows of their vehicles can become fogged with moisture due to the humidity within the vehicle and glass surface temperatures that contact the humid cabin air.

Dehumidification is the process that removes moisture content from the cabin air and defogs the windshield and side glass or other interior glass surfaces. Dehumidification of cabin air for battery electric vehicles (BEVs) is a lower efficiency mode of operation compared to heating of the glass surfaces; higher glass temperatures reduce the risk of moisture condensing on the surface and therefore reduce fogging risk, but these strategies impart warm air in the upper regions of the vehicle interior which may not provide desired comfort to the customer. The cabin air should first be conditioned to a temperature below the dewpoint to dry it (moisture condensed and removed from the cabin as liquid condensate), and then reheated to an acceptable temperature to achieve or maintain cabin comfort. The use of electric heat to satisfy customer comfort consumes more energy than a typical pure heating or pure cooling mode of operation, which affects the driving range of a BEV.

SUMMARY

One embodiment may be a vehicle system. The vehicle system may comprise a thermal loop and a controller. The thermal loop may include a compressor, condenser, vapor injector, internal heat exchanger, chiller, and bypass valve. The controller may be programmed to, during a dehumidification operation and responsive to occurrence of a first condition, open an injector valve of the vapor injector such that the vapor injector allows flow of mid-pressure vapor into the compressor injection inlet, and open the bypass valve such that fluid flow through the internal heat exchanger.

Another embodiment may be a method. The method may comprise, during a dehumidification operation of a thermal loop that includes a compressor, condenser, vapor injector, chiller, internal heat exchanger, and bypass valve fluidly in parallel with the internal heat exchanger, closing the bypass valve such that fluid flow through the internal heat exchanger increases and an injector valve of the vapor injector remains closed.

A third embodiment may be a vehicle. The vehicle may comprise a cooling system and a controller. The cooling system may include an injector valve and a bypass valve. The injector valve may be configured to actuate between a first injector state permitting fluid flow through a vapor injector and a second injector state inhibiting fluid flow through the vapor injector. The bypass valve may be configured to actuate between a first bypass state permitting fluid flow through an internal heat exchanger and a second bypass state inhibiting fluid flow through the internal heat exchanger, or a third bypass state permitting fluid flow through both the internal heat exchanger and the bypass valve. The controller may be programmed to, during a dehumidification operation, actuate the bypass valve from the second bypass state to the first bypass state while the injector valve remains in the second injector state.

BRIEF DESCRIPTION OF THE DRAWINGS

FIG. 2 illustrates a first thermal system.

FIG. 3 defines a toasty protocol.

FIG. 4 defines a first toasty dehumidification method.

FIG. 5 defines a first basic dehumidification method.

FIG. 6 illustrates a second thermal system.

FIG. 7 defines a higher evaporation protocol.

FIG. 8 defines a first high evaporation dehumidification method.

FIG. 9 defines a second basic dehumidification method.

FIG. 10 illustrates a third thermal system.

FIG. 15 depicts a fine-tuning protocol.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
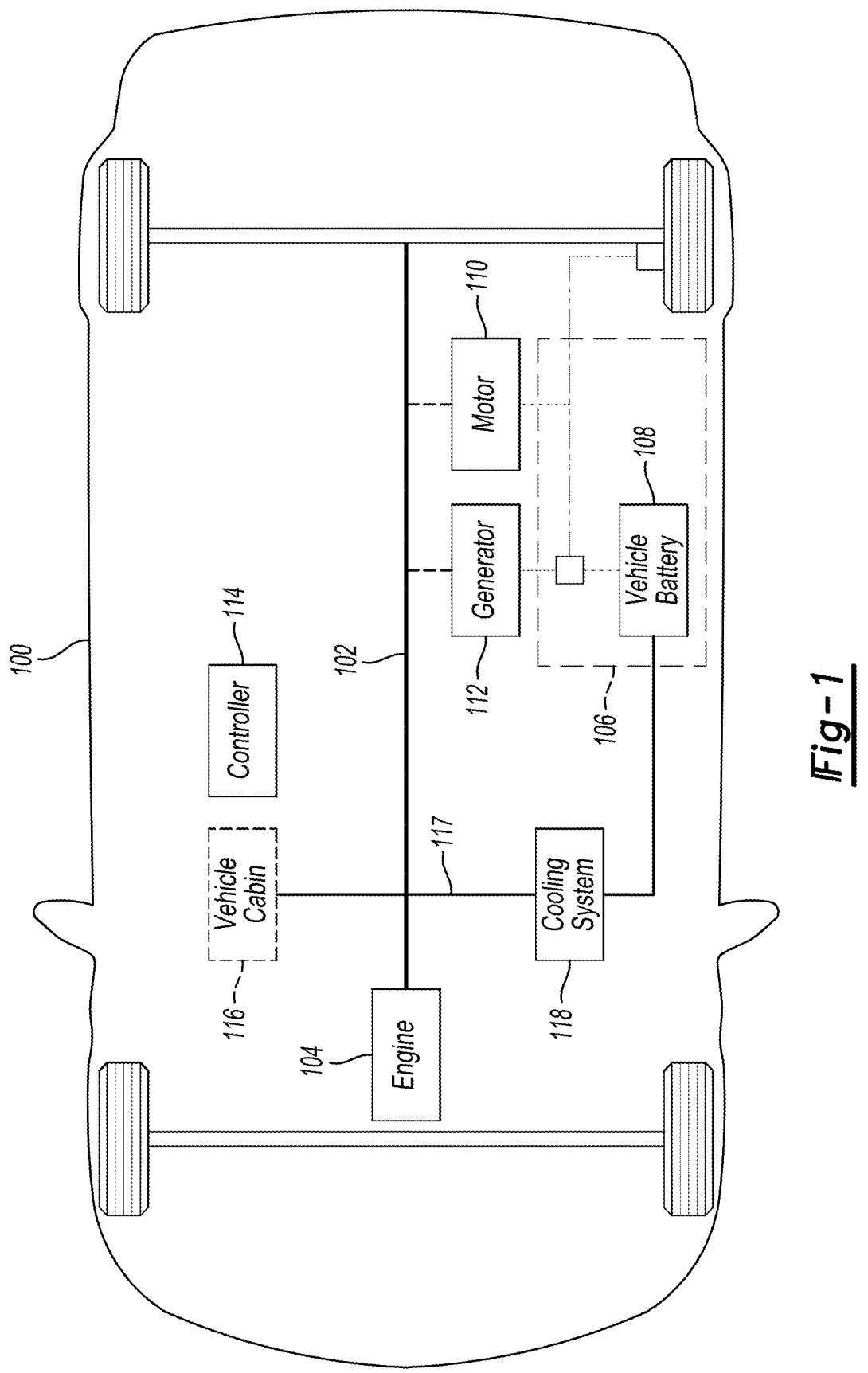
FIG. 1 depicts an embodiment comprising a vehicle.

FIG. 1 depicts an embodiment comprising a vehicle 100. The vehicle 100 may include a drivetrain 102. The drivetrain 102 may be in at least one of electrical, magnetic, and mechanical communication with at least one of an internal combustion engine 104, an electric power source, and a regenerative braking system. In some embodiments, the drivetrain 102 may be in fluid communication with an internal combustion engine. For example, the vehicle may have a torque converter between the drivetrain 102 and the internal combustion engine. Alternatively, the vehicle may have a clutch between the drivetrain 102 and the internal combustion engine.

The vehicle may include an engine 104. The engine 104 may be used to provide torque to a propulsion system within a vehicle. The engine 104 may convert chemical energy from a fuel source into mechanical energy. In particular, the engine 104 may provide mechanical energy in the form of rotational energy exerted upon a crankshaft. The engine 104 may be configured to provide the mechanical energy to a transmission through the crankshaft. The engine 104 may be in communication with a vehicle controller. The engine 104 may include a plurality of sensors. One of the sensors may determine and provide engine parameters to a vehicle controller. For example, an engine sensor may determine and provide engine speed, fuel economy, lubricant level, or other engine parameters.

The vehicle may include a power network 106. The power network 106 may be configured to facilitate the electrical communication between power electronics within a vehicle. The power network 106 may use a plurality of electrical bus networks to facilitate the communication. One of the electrical bus networks may be a high-voltage bus network. The high-voltage bus network may be configured to provide DC electricity to electrical components requiring a high voltage. For example, the high-voltage bus network may be configured to have an electrical potential difference of 500 volts. The high-voltage bus network may be configured to be in direct electrical communication with a vehicle battery. Another of the electrical bus networks may be a low-voltage bus network. The low-voltage bus network may be configured to provide DC electricity to electrical components that require a low voltage. For example, the low-voltage bus network may be configured to have an electrical potential difference of 12 volts. The low-voltage bus network may be in direct electrical communication with a supplementary battery. The power network 106 may have a converter. The converter may be configured to convert electricity of a first set of electrical parameters into a second set of electrical parameters. For example, the converter may be configured to convert electricity having 500 volts into electricity having 12 volts. The power network 106 may include a common ground. The ground may be configured to act as a source of low electrical potential to facilitate the flow of electrical current. In some embodiments, the high-voltage bus network shares a common ground with the low-voltage bus network. Alternatively, the power network 106 may have a plurality of electrical grounds.

The power network 106 may include a vehicle battery 108. The vehicle may include a vehicle battery 108. The vehicle battery 108 may be used to provide torque to a propulsion system within a vehicle. The vehicle battery 108 may be a traction battery. The vehicle battery 108 may be used to store electrical energy. Further, the vehicle battery 108 may be used to convert the stored electrical energy into mechanical energy to propel a vehicle. The vehicle battery 108 may include a plurality of battery cells. In some embodiments, at least two of the battery cells of the plurality of battery cells are resistively sequential. In such embodiments, the electrical potential of both of the battery cells may be summed. Alternatively, or additionally, at least two of the battery cells of the plurality of battery cells are resistively parallel. In such embodiments, the electrical current capacity may be summed. The vehicle battery 108 may have a plurality of sensors. One of the sensors may determine and provide battery parameters to a vehicle controller.

The power network 106 may include a converter. The converter may be configured to alter electricity of a first set of parameters into electricity of a second set of parameters. In one embodiment, the converter may convert high voltage electricity into low voltage electricity. For example, the converter may convert 480 volts into 24 volts. Additionally, or alternatively, the converter may converter electricity having 24 volts into electricity having 480 volts. The converter may be bidirectional regarding direction of conversion. In some embodiments, the converter may be configured to vary its conversion. In such examples, the converter may be configured to change its conversion in response to a command from a controller. For example, the converter may be configured to convert 480 volts into 24 volts in response to a first command from a controller, and further configured to convert 480 volts into 12 volts in response to a second command from the controller.

The vehicle may include a motor 110. The motor 110 may be configured to convert electrical energy into mechanical energy. For example, the motor 110 may be configured to receive electrical energy from a vehicle battery 108 to provide mechanical energy to a vehicle drivetrain 102. Alternatively, the motor 110 may be configured to receive electrical energy from an electrical bus network. As such, the motor 110 may be configured to receive electrical energy from other vehicle components configured to provide electrical energy to the electrical bus network. The motor 110 may be configured to receive DC electricity.

The vehicle may include a generator 112. The generator 112 may be configured to convert mechanical energy into electrical energy. In some embodiments, the generator 112 may be configured to convert mechanical energy from an internal combustion engine into electrical energy for charging a vehicle battery. The generator 112 may also be used to convert mechanical energy from an internal combustion engine 104 into electrical energy for powering a vehicle load. The generator 112 may be configured to output DC electricity.

The vehicle 100 may include a vehicle cabin 116. The vehicle cabin 116 may be disposed within the vehicle 100. The vehicle cabin 116 may be configured to house passengers of the vehicle 100. The vehicle cabin 116 may be in thermal communication with a transparent plane of the vehicle 100. For example, the vehicle cabin 116 may be in thermal communication with a window of the vehicle 100. The vehicle cabin 116 may further include an interface. From the interface, a passenger of the vehicle 100 may request dehumidification of fluid within the vehicle cabin. Additionally, or alternatively, a request to dehumidify a fluid within the vehicle cabin may be requested remote to the vehicle. The request may be provided to a controller. A request to dehumidify may also be initiated by automated control systems and sensors of the vehicle, independent of a request from other sources.

The cooling system 118 may include a vehicle cabin fluid channel 117. The vehicle fluid channel 117 may be configured to allow thermal communication between the components of a thermal circuit and the vehicle cabin. For example, the vehicle fluid channel 117 may allow thermal communication between the vehicle cabin and a condenser and a chiller.

The cooling system 118 may include a moisture collector. The moisture collector may be in fluid communication with a vehicle cabin fluid channel. The moisture collector may be configured to remove liquid from a fluid within the vehicle cabin fluid channel.

The controller 114 may include a memory system and a processor. The memory system may be configured to store instruction sets such as programs, algorithms, methods, etc. The memory system may be further configured to receive, monitor, and store values presented to the controller 114. Further, the memory may serve as a database. As such, the memory may create, store, and edit data stored in the database. The database may define a schedule. Alternatively, or additionally, the database may define a plurality of schedules. A schedule may include entries used as reference for operating a device. The processor may be configured to execute instruction sets. The controller 114 may be configured to receive signals indicative of information from external sources including but not limited to sensors, devices, and other controllers. The controller 114 may be configured to receive information by various ways including electrical communication and electrical-magnetic communication. Further, the vehicle may comprise a plurality of controllers. The controller 114 may be configured to send a command to a cooling system to operate upon receiving a dehumidification request.

The vehicle further includes a cooling system 118. The vehicle has a cooling system in thermal communication with a primary battery. The cooling system 118 may be configured to regulate the temperature of the primary battery. The cooling system 118 may be configured such that it may provide a coolant fluid to the primary battery. The cooling system 118 may be in thermal communication with a vehicle cabin 116. In some embodiments, the cooling system 118 may be in thermal communication with the vehicle cabin 116 via fluid communication. In one embodiment, the cooling system 118 may be configured to reheat the vehicle cabin 116.

The cooling system 118 may include a compressor. The compressor may be configured to receive low pressure, low temperature gas. Further, the compressor may be configured to also receive medium temperature, medium pressure gas. The compressor may be configured to convert low temperature, low pressure gas or a combination of low temperature, low pressure gas and medium temperature, medium pressure gas into high temperature, high pressure gas. For example, the compressor may be configured to convert at least gas of 30 degrees to gas of 110 degrees. The compressor may be configured to provide the high temperature and high pressure gas to a thermal circuit.

The cooling system 118 may include a condenser. The condenser may be configured to receive high temperature and high pressure gas. The condenser may be configured to convert high temperature and high pressure gas into a high temperature, high pressure liquid. In some embodiments, the condenser may be configured to convert high temperature gas into a mixture of high pressure gas and liquid. Even further, the condenser may be configured to convert some of the high temperature gas into subcooled liquid. The condenser may be configured to provide a liquid to a thermal circuit.

The cooling system 118 may include an expansion valve. The expansion valve may be configured to receive a high temperature, high pressure liquid. The expansion valve may then convert the high temperature liquid into a low temperature, low pressure mixture of liquid and gas.

The cooling system 118 may include a chiller. The chiller may be configured to receive the mixture of low pressure, low temperature liquid and gas from the expansion valve. The chiller may be configured to convert the low temperature, low pressure mixture of liquid and gas into a low temperature, low pressure vapor. The chiller may be configured to provide a low temperature low pressure gas to a thermal circuit.

The cooling system 118 may include a vapor injector. The vapor injector may be configured to switch between an operational state and a bypass state. When the vapor injector is in a bypass state, the vapor injector may be configured to receive a high temperature, high pressure liquid in a main input and flow high temperature, high pressure liquid out of a main output mostly unchanged. When the vapor injector is in an operational state, the vapor injector may be configured to receive a high temperature, high pressure liquid in a main input and flow high temperature, high pressure liquid out of a main output in addition to receiving a high temperature liquid into a secondary input and flow medium temperature, medium pressure gas out of a secondary output. The vapor injector may convert the high temperature liquid into a medium temperature gas using an expansion valve. Additionally, the vapor injector may use a counterflow technique to increase vapor output. In the counter flow portion of the vapor injector, a main channel may be in thermal communication with a secondary channel of the vapor injector.

The cooling system 118 may include an internal heat exchanger. The internal heat exchanger may be configured to receive a high temperature, high pressure liquid. Additionally, the internal heat exchanger may be configured to receive a low temperature, low pressure gas. The internal heat exchanger may be configured to increase the temperature of the low temperature gas. The internal heat exchanger may use a counterflow technique to increase the temperature of the low temperature gas.

The cooling system 118 may include a bypass valve, a three-way valve, or a combination of valves. The bypass valve (interchangeably herein as three-way valve or combination of valves) may be disposed fluidly parallel to an internal heat exchanger. The bypass valve may be configured to provide a path for fluid to flow around an internal heat exchanger. The bypass valve may be configured to switch between an open state and a closed state. When in an open state, fluid flowing through an internal heat exchanger may decrease. When the internal heat exchanger bypass is in a closed state, fluid flowing through an internal heat exchanger may increase. Further, the internal heat exchanger bypass may include various states between the open and closed state.

The cooling system 118 may include a vehicle cabin fluid channel. The vehicle fluid channel may be configured to allow thermal communication between the components of a thermal circuit and the vehicle cabin. For example, the vehicle fluid channel may allow thermal communication between the vehicle cabin and a condenser and a chiller.

The cooling system 118 may include a moisture collector. The moisture collector may be in fluid communication with a vehicle cabin fluid channel. The moisture collector may be configured to remove liquid from a fluid within the vehicle cabin fluid channel.

FIG. 2 illustrates a first thermal system 200. The first thermal system 200 may define a thermal loop. The first thermal system 200 may include a first thermal fluid. The first thermal system 200 includes a compressor 202. The first thermal fluid may be configured to flow from the compressor 202 to a condenser 204. The condenser 204 may be configured to flow the first thermal fluid to a vapor injector 212 that includes an injector valve 214, a bypass valve 215, and a heat exchanger 217. The vapor injector 212 may then flow the first thermal fluid through the vapor injector 217 to chiller 206 and the compressor 202. Fluid flowing to the compressor 202 may also flow through the injector valve 214, bypass valve 215 when open, and heat exchanger 217. As such, the injector valve 214 may increase or decrease vapor flow to the compressor 202 based on its actuation. The chiller 206 may then flow the first thermal fluid back to the compressor 202, completing the thermal loop.

FIG. 3 defines a toasty protocol 300. The toasty protocol 300 begins with a dehumidification request step 302, in which the system receives a dehumidify request. Next in a parameter comparison step 304, the system compares a first parameter value to a second parameter value. If the first parameter value is greater than the second parameter value, the system moves to a request toasty dehumidification execution step 306, in which the system elects to execute the toasty dehumidification method. If the first parameter value is less than a second parameter value, the system moves to a request basic dehumidification execution step 308, in which the system elects to execute the basic dehumidification method. The toasty protocol 300 concludes by moving to a request fine tuning step 310, in which the temperature of the vehicle is fine tuned.

FIG. 4 defines a first toasty dehumidification method 400. The toasty dehumidification method 400 begins with a vapor injection state step 402, in which the status of the vapor injector is determined. If the vapor injector is not in an error state, the method will move to a activate vapor injector step 404, in which the vapor injector is activated. If the vapor injected is in an error state or upon completion of the activate vapor injector step 404, the method will move to a send feedback step 406, sending feedback to a controller.

FIG. 5 defines a first basic dehumidification method 500. The basic dehumidification method 500 begins with a vapor injection state step 502, in which the operation status of the vapor injector is determined. If the vapor injector is operating, the basic dehumidification method 500 moves to a deactivate vapor injector step 504, in which the vapor injector is deactivated. If the vapor injector is not operating, or upon completion of the deactivate vapor injector step 504, the basic dehumidification method 500 moves to a send feedback step 506, sending feedback to the controller.

FIG. 6 illustrates a second thermal system 600. The second thermal system 600 may define a thermal loop. The second thermal system 600 may include a first thermal fluid. The second thermal system 600 includes a compressor 602. The first thermal fluid may be configured to flow from the compressor 602 to a condenser 604. The condenser 604 may be configured to flow the first thermal fluid to an internal heat exchanger 616. The internal heat exchanger 616 may be configured to then flow the first thermal fluid to a chiller 606. The chiller 606 may then flow the first thermal fluid to one of an internal heat exchanger 616 and a bypass valve 618. The first thermal fluid may flow from both the internal heat exchanger 616 and the bypass valve 618 back to the compressor 602, completing the thermal loop.

FIG. 7 defines a higher evaporation protocol 700. The higher evaporation protocol 700 begins with a dehumidification request step 702, in which the system receives a dehumidify request. Next in a parameter comparison step 704, the system compares a first parameter value to a second parameter value. If the first parameter value is greater than the second parameter value, the system moves to a request higher evaporation dehumidification execution step 706, in which the system elects to execute the high evaporation dehumidification method. If the first parameter value is less than a second parameter value, the system moves to a request basic dehumidification execution step 708, in which the system elects to execute the basic dehumidification method. The higher evaporation protocol 700 concludes by moving to a request fine tuning step 710, in which the temperature of the vehicle is fine tuned.

FIG. 8 defines a first high evaporation dehumidification method 800. The high evaporation dehumidification method 800 begins with a low-pressure bypass valve state step 802, in which the status of the low-pressure bypass valve is determined. If the low-pressure bypass valve is closed, the method will move to an open low-pressure bypass valve step 804, in which the low-pressure bypass valve is opened. If the low-pressure bypass valve is open, or upon completion of the open low-pressure bypass valve step 804, the method will move to a send feedback step 806, sending feedback to a controller.

FIG. 9 defines a second basic dehumidification method 900. The basic dehumidification method 900 begins with a low-pressure bypass valve state step 902, in which the operation status of the low-pressure bypass valve is determined. If the low-pressure bypass valve is closed, the basic dehumidification method 900 moves to an open low-pressure bypass valve step 904, in which the low-pressure bypass valve is opened. If the low-pressure bypass valve is opened, or upon completion of the open low-pressure bypass valve step 904, the basic dehumidification method 900 moves to a send feedback step 906, sending feedback to the controller.

FIG. 10 illustrates a third thermal system 1000. The third thermal system 600 may define a thermal loop. The third thermal system 600 may include a first thermal fluid. The third thermal system 600 includes a compressor 1002. The first thermal fluid may be configured to flow from the compressor 1002 to a condenser 1004. The condenser 1004 may be configured to flow the first thermal fluid to a vapor injector 1012 that includes an injector valve 1014, a bypass valve 2015, and a heat exchanger 1017. The vapor injector 1012 may then flow the first thermal fluid to an internal heat exchanger 1016. The internal heat exchanger 1016 may be configured to then flow the first thermal fluid to a chiller 1006. The chiller 1006 may then flow the first thermal fluid to one of an internal heat exchanger 1016 and a bypass valve 1018. The first thermal fluid may flow from both the internal heat exchanger 1016 and the bypass valve 1018 back to the compressor 1002, completing the thermal loop.

Figures 11, 12:
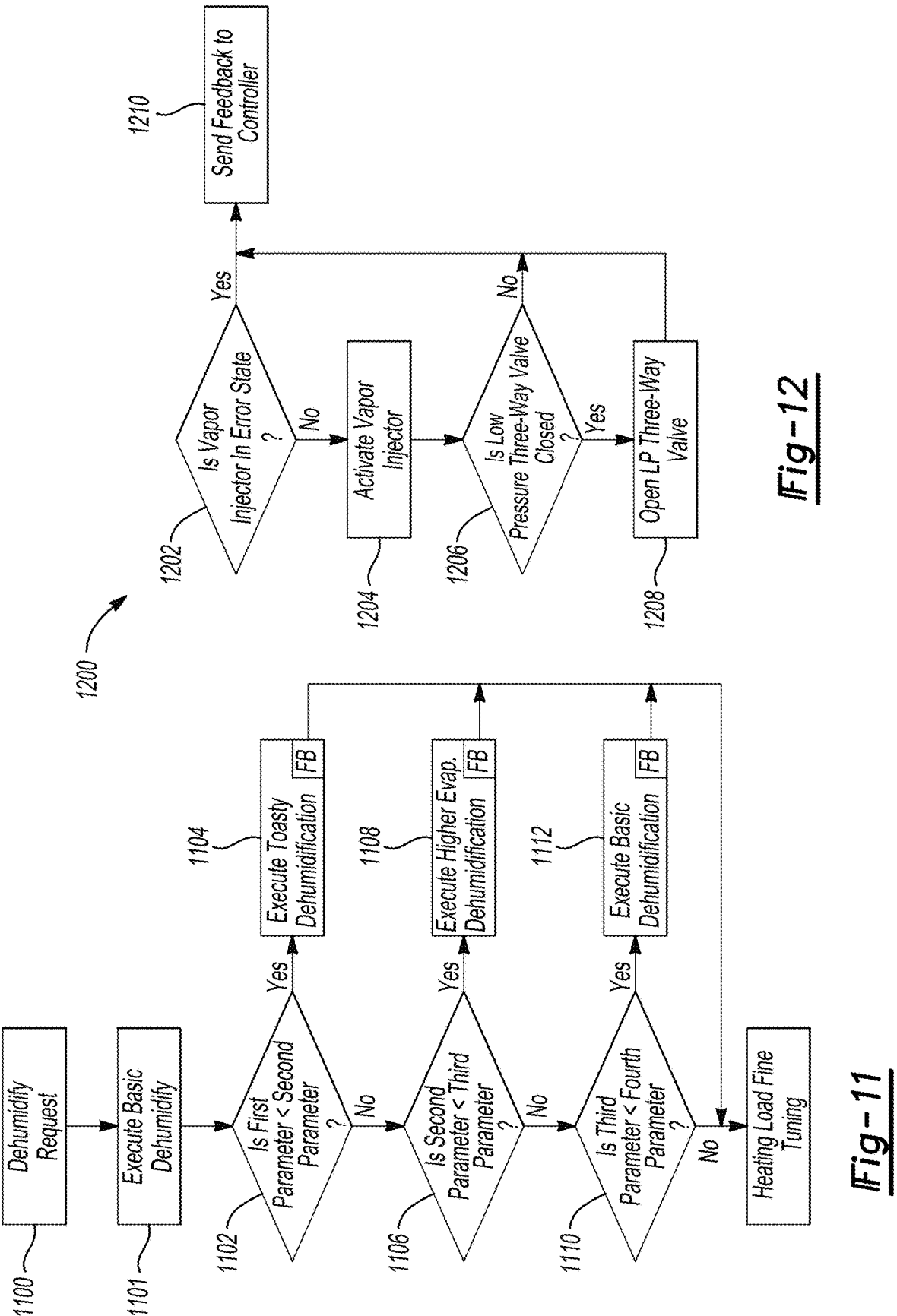
FIG. 11 depicts a blended heating protocol.
FIG. 12 defines a second toasty dehumidification method.

FIG. 11 depicts a blended heating protocol. In the blended heating protocol, the controller 114 may be configured to receive vehicle parameters. The parameters may include a cabin temperature, a cabin pressure, a cabin humidity, an environmental ambient temperature, an environmental ambient pressure, and an environmental ambient humidity. The controller 114 may be programmed to select one of the heating strategies based upon the vehicle parameters. In the heating strategy protocol, the control targets are identified, the values will be compared to a range of expected values.

In the first comparison step, the controller 114 will compare the first and second parameter values in the first parameter comparison step 1102. If the first parameter value is less than the second, the controller 114 will command the cooling system 118 to operate the toasty dehumidification strategy 1200.

At step 1101, the controller 114 will execute the basic dehumidify strategy responsive to a dehumidify request at operation 1100.

If the first parameter value is greater than the second, the protocol will move to the second comparison step. In the second comparison step, the controller 114 will compare the second and third parameter values in the second parameter comparison step 1104. If the second parameter value is less than the third parameter value, the controller 114 will command the cooling system 118 to operate the higher evaporator dehumidification strategy 1300.

If the second parameter value is greater than the third parameter value, the protocol will move to the third comparison step 1106. In the third comparison step 1106, the controller 114 will compare the third and fourth parameter values. If the third parameter value is less than the fourth parameter value, the controller 114 will command the cooling system 118 to operate basic dehumidification strategy 1400.

FIG. 12 defines a second toasty dehumidification method 1200. The toasty dehumidification method 1200 begins with a vapor injection state step 1202, in which the status of the vapor injector is determined. If the vapor injected is in an error state, the method will move to a send feedback step 1210, sending feedback to a controller. If the vapor injector is not in an error state, the method will move to an activate vapor injector step 1204, in which the vapor injector is activated. After completion of the activate vapor injector step 1204, the toasty dehumidification method 1200 will determine the status of the bypass valve in the low-pressure bypass valve state step 1206. If the low-pressure bypass valve is open, the toasty dehumidification method 1200 will move to a send feedback step 1210, sending feedback to a controller. If the low-pressure valve is closed, the toasty dehumidification method will move to an open low pressure valve step 1208, in which the low pressure valve is opened, followed by moving to the feedback step 1210.

Figures 13, 14:
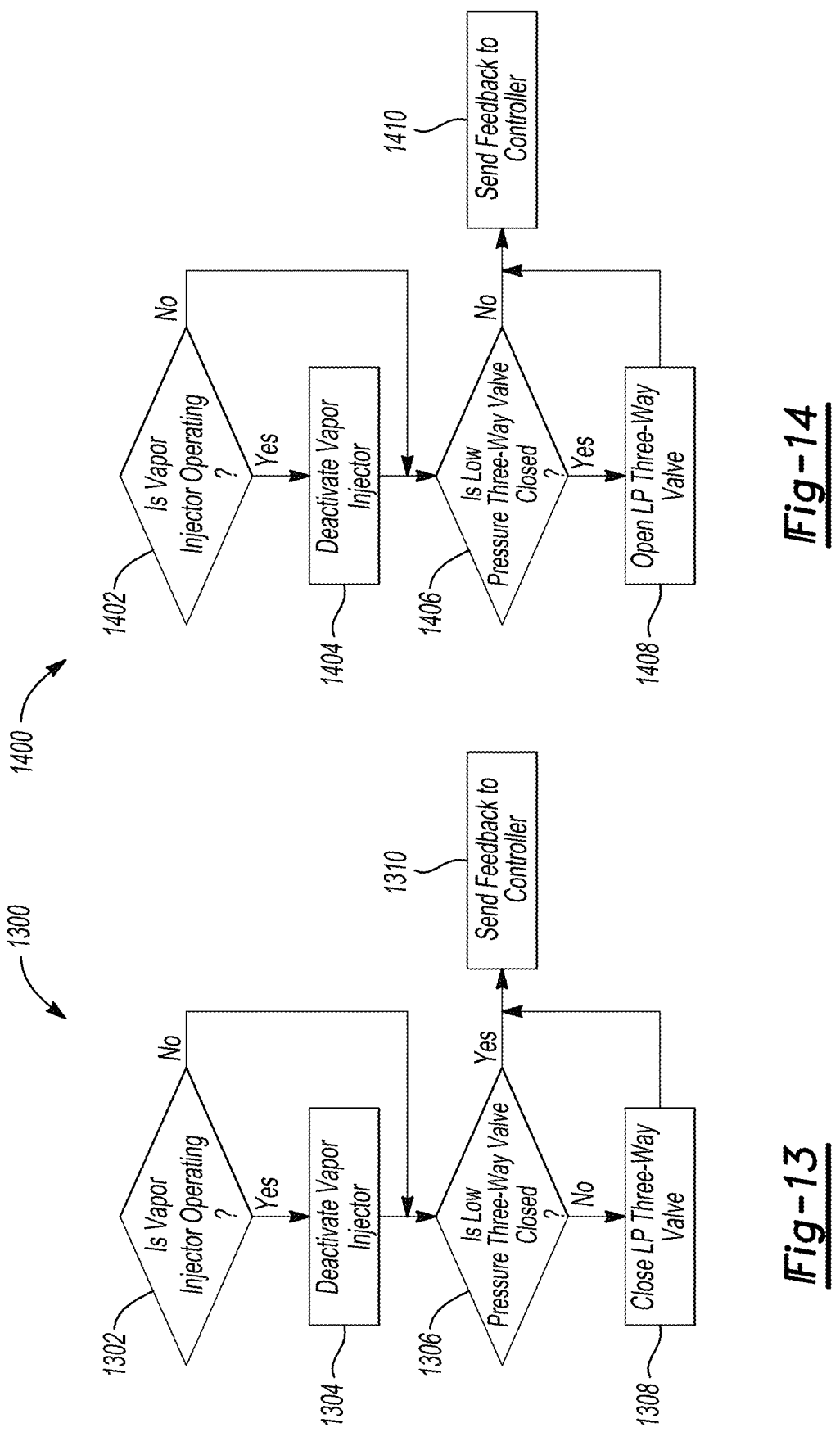
FIG. 13 defines a second high evaporation dehumidification method.
FIG. 14 defines a third basic dehumidification method.

FIG. 13 defines a second high evaporation dehumidification method 1300. The high evaporation dehumidification method 1300 begins with a vapor injection state step 1302, in which the status of the vapor injector is determined. If the vapor injector is operating, the method will move to a deactivate vapor injector step 1304, in which the vapor injector is deactivated. If the vapor injected is not operating, or after completion of the activate vapor injector step 1304, the high evaporation dehumidification method 1300 will determine the status of the bypass valve in the low-pressure bypass valve state step 1306. If the low-pressure bypass valve is closed, the high evaporation dehumidification method 1300 will move to a send feedback step 1310, sending feedback to a controller. If the low-pressure valve is open, the high evaporation dehumidification method will move to a close low pressure valve step 1308, in which the low pressure valve is closed, followed by moving to the feedback step 1310.

FIG. 14 defines a third basic dehumidification method 1400. The basic dehumidification method 1400 begins with a vapor injection state step 1402, in which the status of the vapor injector is determined. If the vapor injector is operating, the method will move to a deactivate vapor injector step 1404, in which the vapor injector is deactivated. If the vapor injected is not operating, or after completion of the activate vapor injector step 1404, the basic dehumidification method 1400 will determine the status of the bypass valve in the low-pressure bypass valve state step 1406. If the low-pressure bypass valve is open, the basic dehumidification method 1400 will move to a send feedback step 1410, sending feedback to a controller. If the low-pressure valve is closed, the basic dehumidification method will move to an open low pressure valve step 1408, in which the low pressure valve is opened, followed by moving to the feedback step 1410.

FIG. 15 depicts a fine-tuning protocol 1500. In the fine-tuning protocol, feedback data is gathered in the feedback step 1502. Next, the controller 114 may compare the feedback data to a temperature value in the heating error step 1504. The temperature value may define a predetermined limit. If the controller feedback is within the predetermined limit, the controller 114 may command the cooling system to maintain the actuator positions in the maintenance step 1518. If the controller feedback is not within the predetermined limit, the controller 114 will determine if the compressor speed is being limited by the low-pressure side of the compressor in the compressor speed analysis step 1506. If the low-pressure side is limiting the compressor, the controller 114 will activate the heater in the heater activator step 1510. Next the controller 114 will adjust the actuator points in the actuator adjustment step 1516. The controller 114 will then restart by comparing the temperature to the predetermined limit. If the compressor speed is not being limited by the low-pressure side of the compressor, the controller 114 will collect the status of the heater in the heater analysis step 1508. If the heater is active, the controller 114 will command the cooling/heating system 118 to deactivate the heater in the heater deactivation step 1512, before adjusting the compressor speed in the compressor speed adjustment step 1514. If the heater is not active, the controller 114 will move directly to adjust the compressor speed. After adjusting the compressor speed, the controller 114 will command the cooling/heating system 118 to adjust the actuator points. The controller 114 will then restart by comparing the temperature to the predetermined limit.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle thermal system comprising: a thermal loop including a compressor, condenser, vapor injector, internal heat exchanger, chiller, and bypass valve; and a controller programmed to, in response to a dehumidify request resulting in a dehumidification operation and in response to a first parameter value being less than a second parameter value, open an injector valve of the vapor injector such that the vapor injector injects vapor into the compressor, and open the bypass valve such that fluid-flow through the internal heat exchanger decreases.

2. The vehicle thermal system of claim 1, wherein the controller is further programmed to open the bypass valve such that refrigerant flows through the bypass valve instead of the internal heat exchanger before entering the compressor.

3. The vehicle thermal system of claim 1, wherein the internal heat exchanger and bypass valve are fluidly in parallel.

4. The vehicle thermal system of claim 1, wherein the controller is further programmed to, during the dehumidification operation, close the injector valve to control the vapor injected into the compressor.

5. The vehicle thermal system of claim 1, wherein the controller is further programmed to, during the dehumidification operation, close the injector valve to reduce the vapor injected into the compressor and close the bypass valve to increase flow through the internal heat exchanger before entering the compressor.

6. The vehicle thermal system of claim 1, wherein the controller is further programmed to, during the dehumidification operation while the bypass valve is open and an injector valve of the vapor injector is closed, open the injector valve such that the vapor injector injects vapor into the compressor and the bypass valve remains open.

7. The vehicle thermal system of claim 1, wherein the controller is further programmed to, during the dehumidification operation while the bypass valve is open and an injector valve of the vapor injector is closed, close the bypass valve such that flow through the internal heat exchanger increases and the injector valve remains closed.

* * * * *